Jan. 4, 1944.  R. E. ZENNER  2,338,155
FACSIMILE PRINTING TELEGRAPH SYSTEM AND APPARATUS
Filed May 31, 1940  2 Sheets-Sheet 2
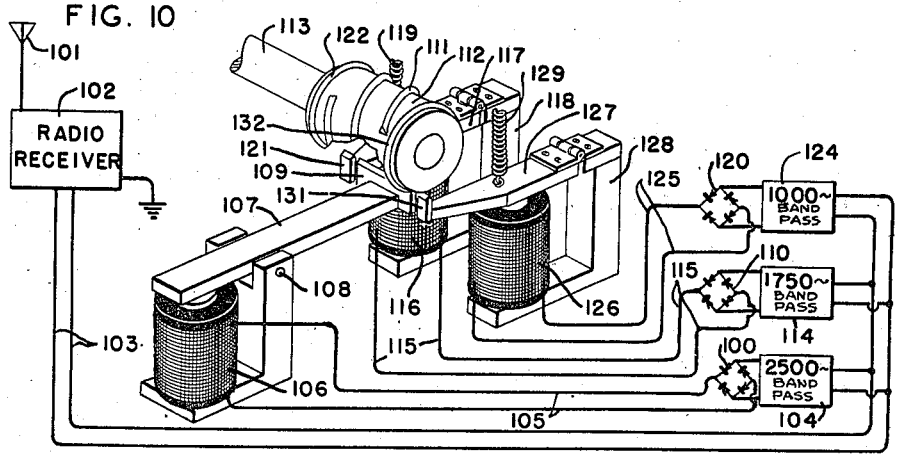
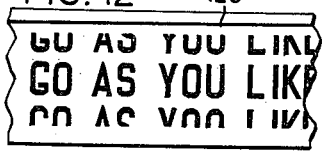
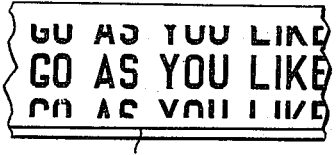
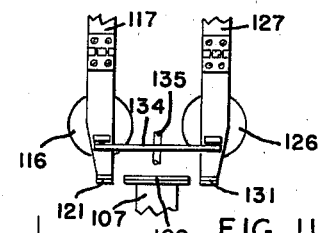
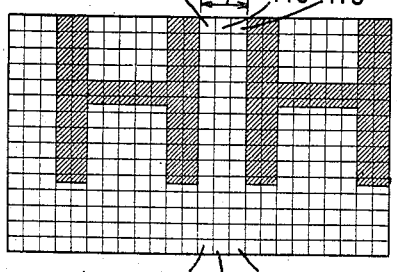
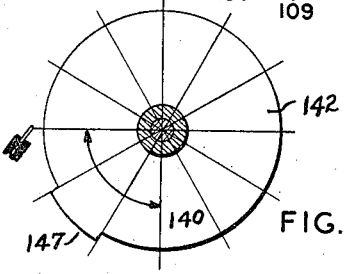
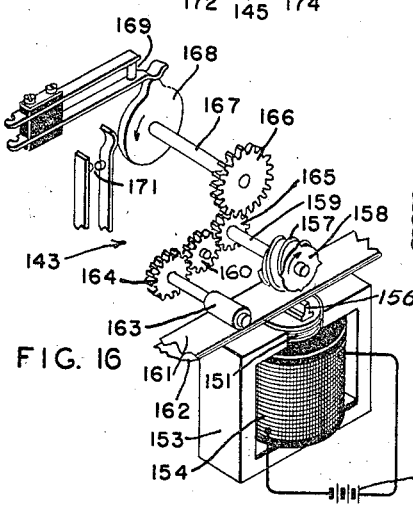
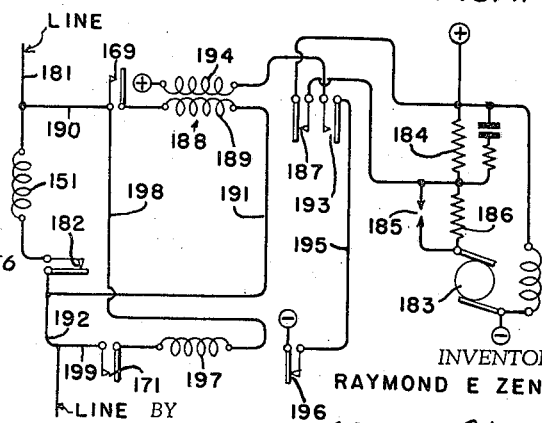
INVENTOR.
RAYMOND E ZENNER
BY H. B. Whitfield
ATTORNEY.

Patented Jan. 4, 1944

2,338,155

UNITED STATES PATENT OFFICE 2,338,155

FACSIMILE PRINTING TELEGRAPH SYSTEM AND APPARATUS

Raymond E. Zenner, Brookfield, Ill., assignor to Teletype Corporation, Chicago, Ill., a corporation of Delaware Application May 31, 1940, Serial No. 338,150

9 Claims. (Cl. 250—8)

The present invention relates to printing telegraph systems and more particularly to the application of such systems to the control of aircraft.

The principal object of the invention is to provide telegraph printers which are responsive dually to character signals and to monitory signals to produce on a single record strip simultaneously, records corresponding to each class of signals.

Another object of the invention is to indicate to aircraft operators, by means of a printed record, their adherence to a predetermined course.

Another object of the invention is to provide a course guiding system for aircraft wherein use is made of the telegraph printing equipment carried thereon for guiding purposes, without disturbing normal message reception and recordation.

A further object of the invention is to control the phasing of printer operation by utilizing the space between printed characters as a control interval.

Specifically, the present invention contemplates the transmission, from an airport or landing field, of messages comprising instructions and simultaneously therewith so-called beacon or radio beam signals. Both of such types of signals will be received by a single printing instrument, carried in aircraft, to provide a printed record wherein the characters are underscored characteristically to indicate, according to a predetermined code, the position of the aircraft with relation to a predetermined course. According to another method of control the radio beacon signals are recorded on the tape along the upper or lower edge instead of underscoring the characters. The motors of such printers can be controlled according to the present invention by interposing between the characters of a message; that is, during the spacing interval, phasing signals which, through a control circuit, will regulate the motor speeds. In achieving the object of the present invention a telegraph printing apparatus is contemplated for recording characters by a series of elemental areas of positive and negative surfaces. To effect such printing, transmitting apparatus is employed wherein each letter, symbol, or character is analyzed into a succession of constituent areas and a code disc of corresponding character embodiments is constructed, which embodiments then are selected under control of key levers or tape sensing devices. In accordance with such scanned or analyzed embodiments, electrical impulses are generated which cause corresponding operation of recording apparatus of the form disclosed in U. S. Patent 2,046,328, to form the characters in a line.

A better understanding of the present invention will be had from the following description taken in conjunction with the accompanying drawings, wherein:

Fig. 1 is a schematic diagram showing the arrangement of aircraft control according to the present invention;

Fig. 2 shows a perspective view of the receiving printer;

Fig. 3 shows the details of a typical transmitting cam disc for generating current impulses representing the character symbols to be transmitted;

Fig. 4 is an elevation of one transmitting disc for sending beacon signals over one antenna;

Fig. 5 is an elevation of another transmitting disc for sending beacon signals over a second antenna;

Fig. 6 shows the analysis of a character for scanning; the character corresponding to the disc of Fig. 3;

Fig. 7 shows a normal record tape made in accordance with this invention with the characters underscored in accordance with the signals transmitted under the control of the disc shown in Fig. 4;

Fig. 8 shows a normal record tape made in accordance with this invention with the characters underscored in response to signals transmitted under the control of the discs shown in Figs. 4 and 5;

Fig. 9 shows a normal record tape made in accordance with the invention with the characters underscored in response to signals received under the control of transmitting disc shown in Fig. 5;

Fig. 10 is a perspective view of another form of receiving printer for recording character signals and radio beam signals on a common tape; the receiving station circuit being schematically shown in connection therewith;

Fig. 11 is a fragmental top view of the printer with the printing wheel removed to show the platen construction;

Figs. 12 and 13 show a normal record tape made in accordance with the modification of the invention shown in Fig. 10;

Fig. 14 shows the analysis of a character for scanning, particularly with relation to the cooperation between the character scanning disc shown in Fig. 3 and the phasing control disc shown in Fig. 15;

cally to the unit 64, continuing immediately at unit 65, again at 66, and again from unit 67 to the middle of unit 71, completing the scanning of forty-nine and one-half successive white units, resulting in the low-radius arc 69 on the disc 62 of Fig. 3. The scanning of black units extends from the middle of unit 71 to unit 72, resulting in the high-radius arc 73. Then the four and one-half white units 74 to 75 result in the low arc 76, and the ten and one-half black units 77 to 78 result in the high arc 79. Continuing in like manner, scanning of the total area of Fig. 6 results in the total arcs on the edge or periphery of disc 62 of Fig. 3. Every character code disc has the initial starting arc 62 of Fig. 3, and all starting arcs 62 of the character discs are arranged in alignment. As indicated in Fig. 1, all of the impulses thus generated from the character code disc, such as 62, are broadcast from the antenna 16 to produce the character symbols shown on the tapes in Figs. 7 to 9.

However, as previously alluded to, the white space between rows of characters is utilized for indicating or printing the beacon or radio beam signals which are generated by the discs 19 and 21 (Figs. 4 and 5, respectively), and since these signal impulses are broadcast sequentially from independent directional antennae (arranged as shown in Fig. 1) they are each printed on the tape with an intensity proportional to the signal strength received from their respective antennae. In other words, in the printing of the mark or dash 70 shown in Fig. 7, the disc 19 of Fig. 4 is used, and scanning begins at unit 63 (Fig. 6) and continues in the same manner as in the case of the character "H" to the middle of unit 81, completing thirty-one and one-half units, resulting in the low-radius arc 82 of the disc 19, beginning at brush 22 (Fig. 4). The scanning of black units extends from the middle of unit 81 to unit 83, resulting in the high-radius arc 84 (Fig. 4). The scanning of thirteen and one-half white units from 83 to the middle of unit 85 results in the low arc 86 (Fig. 4). The scanning then continues in like manner, disregarding the letter "H" (the particular character in the instance illustrated), until unit 87 is reached, to produce the underscoring mark shown in Fig. 7.

With the code disc 21, the scanning of white units begins at 63 (Fig. 6) and continues in the manner described, until the middle of unit 88 is reached, completing one hundred six and one-half white units (as far as code disc 21 is concerned), resulting in the low arc 89 of the disc 21 (beginning with the brush 23, Fig. 5). Further scanning under the control of disc 21 results in the printing of the mark or underscore 80 shown in Fig. 9, the high arc 91 and low arc 92 of disc 21 being comparable in effect to arcs 84 and 86, respectively, of disc 19.

With the arrangement according to the present invention the three radio transmitters 14, 25 and 34 employ the same radio frequency carrier so that only one radio receiver is required in each airplane.

If the aircraft 43 is "on course" the intensity of the signals from antennae 29 and 38 (under the control of discs 19 and 21, respectively) will be equal, and hence the underscoring will appear on the printed record as marks or dashes 90, shown in Fig. 8. If the aircraft 43 is "off course to the left" as it approaches the antenna 16, the signals from antenna 38 will be stronger than the signals from antenna 29, thus resulting in an underscoring shown in Fig. 9. Similarly, being "off course to the right" the record will appear on the tape as shown in Fig. 7.

From the foregoing it is seen that ordinary printed messages and monitory signals, such as beacon or radio beam signals, can be printed simultaneously and/or independently on the tape or record material.

An alternate form of receiver for recording both printed messages and monitory or beacon signals is shown in Figs. 10 and 11. With this form of invention, the transmitting station shown in Fig. 1 is employed, with the exception that radio transmitters 25 and 34 transmit continuous signals of different audio frequencies, instead of impulses as controlled by discs 19 and 21. The radio frequencies, of the signals emanating from all the antennae 16, 28, 29, 37 and 38 are the same. As in the embodiment of the invention already described, only one radio receiver is required in each airplane. For example, all of the signals are received through the receiving antenna 101 (of the aircraft, for instance) and are demodulated by the radio receiver 102 (Fig. 10). The signal transmitted by antenna 16 (Fig. 1) is directed over conductors 103, thence through the 2500 cycle band pass filter 104 and then through rectifier 109 and over conductors 105, through the winding of magnet 106 to rock armature 107 thereof about pivot shaft 108 in accordance with the character signal impuses received. Carried on armature 107 is a knife edged platen member 109 which co-operates with the spiral edge 111 on a printing wheel 112, in the manner substantially as described in connection with the printer shown in Fig. 2, to produce on a tape a record of printed characters as shown in Figs. 12 and 13. The printing wheel 112 is rotated through shaft 113 by a motor (not shown).

The signals transmitted by the antenna 38 (for example) are of a frequency of 1750 cycles, and upon reception at the station shown in Fig. 10 are directed over conductors 103, thence through the 1750 cycle band pass filter 114 and then through rectifier 110 and over conductors 115, through the winding of magnet 116 to attract or pull up its armature 117 which is hinged to magnet support 118. Armature 117 is biased by a spring 119 so that, when the magnet 116 is de-energized, the platen 121 integral with armature 117 is brought against an annular ridge 122 on printing wheel 112 to produce on a tape a continuous line 123 adjacent to the upper edge of the tape, as shown in Fig. 12.

Similarly, the signals transmitted by the antenna 29 are of a frequency of 1000 cycles, and upon reception are directed over conductors 103, thence through the 1000 cycle band pass filter 124, and then through rectifier 120 and over conductors 125, through the winding of magnet 126 to attract its armature 127 which is hinged to magnet support 128. Armature 127 is biased by a spring 129 so that, when the magnet 126 is de-energized, the platen 131 integral therewith is brought against an annular ridge 132 on printing wheel 112 to produce on a tape, a continuous line 133 adjacent to the lower edge of the tape, as shown in Fig. 13.

As illustrated in Fig. 11, the armatures 117 and 127 are pivotally articulated to the extremities of a lever 134 centrally pivoted on a shaft 135, so that when the signals received by one of the magnets 116 or 126 are stronger than the signals received by the other, a line 123 or 133 will be printed. For example, if the 1000 cycle signal is stronger than the 1750 cycle signal, due to the aircraft being "off course" toward the 1000 cycle field or antenna, the magnet 126 will be energized and its armature 127 will be attracted against the pull of spring 129, thus rocking lever 134 in such manner as to raise armature 117 to bring platen 121 into co-operation with ridge 122 to produce line 128 on the tape as shown in Fig. 12; and this occurs irrespective of whether characters are printed simultaneously therewith or not. Conversely, if the 1750 cycle signal is stronger, magnet 116 will be operated to cause platen 131 to co-operate with ridge 132 to produce line 133 (Fig. 13). If the 1000 cycle and 1750 cycle signals are of equal strength or intensity the lever 134 will remain in a neutral position and no printing will occur.

In accordance with the feature of the invention shown in Figs. 14 to 17, the characters "H" in Fig. 14 are recorded according to the method of prescanning disclosed in connection with Figs. 3 and 6. As indicated in Fig. 14, the space, identified by the numeral 144, between characters is represented by three vertical rows of units equivalent to the ninety degrees of arc 141 on the disc 62 (Fig. 3). The transmitter 11 (Fig. 1) is provided with an extra disc 142, as illustrated in Fig. 15, which is so cut on its periphery as to transmit a control impulse, which should during proper synchronization, be received by the receiver, indicated generally as 143 in Fig. 16 (and comparable to previously described printer 18 Fig. 2), during the middle one-third of the space interval 144 (Fig. 14) between characters. This control impulse would be scanned, during proper synchronization, from unit 145 to unit 146 in Fig. 14, resulting in, and exemplified by, the high radius arc 147 of disc 142 (Fig. 15), which embraces the middle one-third of the quadrant 149 of disc 142 (Fig. 15), comparable to quadrant 141 of disc 62 (Fig. 3).

Having reference to Fig. 16, the printer 143 comprises a line coil 151 which is suspended in a radial magnetic field due to the electromagnet 153, which is provided with a winding 154 through which a current is passed by a battery 155 over an obvious circuit. The coil 151 carries a knife-edged platen member 156 which is adapted to co-operate with the spiral ridge 157 integral with a printing wheel 158 carried on a shaft 159 geared to a motor (not shown). An ink ribbon 161 and a tape 162 are pulled through the space between printing wheel 158 and platen 156 by a feed roller mechanism 163 geared, through gears 160 and 164, to a pinion 165 carried on shaft 159. Coil 151 thus oscillates in accordance with the signal impulses received over the signal line, to force the platen 156 against the printing wheel 158 to produce character marks on the tape 162 in well-known manner. Also meshed with the pinion gear 165 is a gear 166 fixed to a shaft 167, to which is also fixed a cam 168. Co-operating with cam 168 are contacts 169 and 171. The phasing or speed relation between the rotating cam and the printing wheel 158 is such that contacts 169 are closed during the interval of scanning the vertical row of units 172 to 173 in Fig. 14. Both contacts 169 and 171 are open during the period of scanning the vertical row comprising or embracing units 145 to 146 in Fig. 14. Further, contact 171 is closed during the interval of scanning the vertical row between units 174 and 175 in Fig. 14.

In the electrical circuit diagram shown in Fig. 17 the signal line is indicated as 181 and the line coil 151 is connected therein. Since the control impulse generated through the instrumentality of code disc 142 is of the same polarity as the signal impulses generated under the control of the character code discs (for example disc 62, Fig. 3), and since it is not desirable to energize coil 151 with the control impulse in such a manner as to produce a printed record, a third contact 182, which is cam operated, may be provided to open the circuit of the coil 151 during the scanning of the space interval between characters (exemplified by 144 in Fig. 14). A motor 183 is indicated diagrammatically in Fig. 17 as connected from positive battery, through resistance 184, and governor (comprising contact 185 and resistance 186), through motor brushes and windings to negative battery.

To effect the motor control according to the present invention, the resistance 184 is short circuited to effect a speeding up of the motor 183, as will presently appear. If the motor 183 and the printer controlled thereby are operating at the proper speed, the control impulse generated by disc 142 will be received during the middle one-third of the space 144 between characters, during which time contacts 169 and 171 will be open. The contact 187 will be closed, thus short circuiting the resistance 184. When an out-of-phase condition occurs or exists, the synchronizing or control impulse, exemplified by arc 147 of disc 142 (Fig. 15), will be received either during the first one-third of the space interval 144 (during which units 172 to 173 are scanned), or during the last one-third of the space interval, during which units 174 to 175 will be scanned.

If the control impulse is received when the contact 169 is closed, during the first one-third of the space interval (due to the motor running too fast), a relay 188 will be operated, through its winding 189, by a circuit extending from line 181 to contact 169, through operating winding 189, over conductor 191, thence through conductor 192 again to line. When this occurs contact 187 of relay 188 will open, and contact 193 of said relay will close to complete a locking circuit from battery through locking winding 194 of relay 188, through contact 193, over conductor 195, through a contact 196 (now closed), thence to negative battery. Contact 196 is associated with and controlled by a relay 197. The opening of contact 187 breaks the short circuit for resistance 184, thus introducing the resistance 184 into the motor circuit, the effect of which will be to slow down the speed of motor 183, and hence of the printer shown in Fig. 16. The relay 188 being locked up over the aforementioned locking circuit, the contact 187 remains open until a further change in motor speed causes the control impulse to be received during the last one-third of the space interval 144.

When the motor 183 slows down to cause the control impulse to be received during the scanning of units 174 to 175, at which time cam operated contact 171 is closed, and contact 169 is open, a circuit for energizing the relay 197 will be completed from line wire 181 over conductors 190 and 198, through the winding of relay 197, through contact 171 (now closed), over conductor 199 to return to the line wire. The energization of relay 197 will cause contact 196 to open, thus breaking the locking circuit for relay 188 and causing the energizing circuit of winding 194 to be broken, whereupon contact 187 will again close, and contact 193 will open. The closing of contact 187 again completes the short circuit for the resistance 184, thus increasing the amount of current directed to the motor 183 causing it to increase its speed.

In the event that it is desired to utilize a control impulse of polarity opposite to that of the signal impulse, the cam operated contact 182 can be eliminated and the coil 151 may be connected directly to conductor 192. With this arrangement the coil 151 will be operated towards the printing wheel 158 only upon the reception of positive impulses generated by the character code discs (for example, disc 62), and since the control impulse is of opposite polarity the coil 151 will not be operated towards the printing wheel 158.

This invention, of course, may be embodied in other specific forms without departing from the spirit thereof. The present embodiment is therefore to be considered in all respects as illustrative and not restrictive, the scope of the invention being indicated by the appended claims rather than by the foregoing description, and all changes which come within the meaning and range of equivalency of the claims are intended to be embraced therein.

What is claimed is:

1. In a facsimile telegraph system adapted to record control signals, a receiver having a driven printing wheel provided with a pair of annular printing edges and a spiral printing edge arranged therebetween, a platen member associated with each printing edge, means for individually moving said platen members toward and away from the circumference of said printing wheel to produce a printed record on a record strip, and means connected to the platens associated with the annular printing edges to render only one of said annular printing edges effective at a time.

2. In a facsimile telegraph system adapted to record control signals, a receiver having a driven printing wheel provided with a pair of annular printing edges and a helical printing edge arranged therebetween, a platen member associated with each printing edge, means for individually moving said platen members toward and away from the circumference of said printing wheel to produce a printed record on a record strip, and means connected to the platens associated with the annular printing edges to render only one of said annular printing edges effective at a time.

3. In combination, in a system for guiding aircraft along a course, a plurality of radiating systems arranged in a group, a corresponding plurality of transmitting devices, means in each device for producing radiations of a predetermined frequency individual to each device, a single receiving apparatus having means responsive to each frequency to make a record on a tape in rows corresponding to the frequency, and means included in said recording means responsive to certain of said frequencies whereby a record is made in only one of two rows at a time.

4. In combination, in a system for guiding aircraft along a course, a plurality of radiating systems arranged in a group, a corresponding plurality of transmitting devices, means in each device for producing radiations of a predetermined frequency individual to each device, and a receiving means comprising filtering and rectifying means for each frequency, a recording means for making in separate rows on a tape a record individual to each frequency radiated by said transmitting devices, and means included in said recording means responsive to certain of said frequencies whereby a record is made in only one of two rows at a time.

5. In combination, in a system for guiding aircraft along a course, a plurality of radiating systems arranged in a group, a corresponding plurality of transmitting devices, means in each device for producing radiations of a predetermined frequency individually respective to each device, and a receiving means comprising filtering and rectifying means for each of said frequencies, a recorder having a driven printing wheel provided with a pair of annular printing edges and a helical printing edge arranged therebetween, a platen member associated with each printing edge, means responsive to respective rectified frequencies for individually moving said platen members toward and away from the circumference of said printing wheel to produce a printed record on a record strip, and means connected to the platens associated with the annular printing edges to render only one of said annular printing edges effective at a time.

6. In combination, in a system for guiding aircraft along a course, a plurality of radiating systems arranged in a group, a corresponding plurality of transmitting devices, means in each device for producing radiations of a predetermined frequency individually respective to each device, and a receiving means comprising filtering and rectifying means for each of said frequencies, a recorder having a driven printing wheel provided with a pair of annular printing edges and a helical printing edge arranged therebetween, a platen member associated with each printing edge, and means responsive to respective rectified frequencies for individually moving said platen members toward and away from the circumference of said printing wheel to produce a printed record directly on the same side of a record strip.

7. In a system of communication for the distant transmission of intelligence composed of two different kinds of symbols formed of light and dark areas, a transmitter having an individual transmitting member for each of the different kinds of symbols, each member having a peripheral contour to provide in one line marking and/or spacing portions corresponding to the light and dark areas in the scanning of its symbol, and including means for transmitting signals in accordance with the peripheral contour of a member identified with one kind of symbol, means for interspersing among said first mentioned signals signals transmitted in accordance with the peripheral contour of a member identified with the other kind of symbol, and a receiver means for directly reproducing at a distant point simultaneously under the control of said first mentioned signals and said interspersed signals facsimiles on the same side of a tape of the different symbols in independent rows corresponding to the respective peripheral contours of the members of the transmitter.

8. In a system of communication for the distant transmission of intelligence composed of two different kinds of symbols, a transmitter having a plurality of transmitting members operable in cycles, one member for each of the different kinds of symbols, each member having a peripheral contour individual to the scanning signals of its allotted symbol, and including means for transmitting signals in accordance with the peripheral contour of a member identified with one kind of symbol, means for interspersing among said first mentioned signals signals transmitted in accordance with the peripheral contour of a member identified with the other kind of symbol, and a receiver means effective for each complete cycle of one member for directly reproducing at a distant point simultaneously under the control of said first mentioned signals and said interspersed signals facsimiles on the same side of a tape of the different symbols in independent rows corresponding to the respective peripheral contours of the members of the transmitter.

9. In combination, in a system for guiding aircraft along a course, a plurality of radiating systems arranged in a group, a corresponding plurality of transmitting devices for controlling the transmission of intelligence composed of two different kinds of symbols, said transmitters having a plurality of transmitting members operable in cycles, one member for each of the different kinds of symbols, each member having a peripheral contour individual to the scanning signals of its allotted symbol, certain of said transmitting devices having means for transmitting over one of said radiating systems signals in accordance with the peripheral contour of a member identified with one kind of symbol, other of said transmitting device having means for interspersing among said first mentioned signals signals transmitted over other of said radiating systems in accordance with the peripheral contour of a member identified with the other kind of symbol, and receiver means responsive to said first mentioned signals and said interspersed signals simultaneously received from said plurality of radiating systems for producing two different permanent records on the same side of a tape composed of the different symbols in independent rows corresponding to the respective peripheral contours of the members of the transmitter, whereby a reader of the records may be advised of a word message and of an aircraft course guiding message.

RAYMOND E. ZENNER.

Patented Jan. 4, 1944

2,338,164

UNITED STATES PATENT OFFICE 2,338,164

EXPLOSIVE COMPOSITION

Robert W. Cairns, Wilmington, Del., assignor to Hercules Powder Company, Wilmington, Del., a corporation of Delaware No Drawing. Application August 31, 1940, Serial No. 355,025

14 Claims. (Cl. 52—7)

This invention relates to blasting explosives, and more particularly to a nongelatinous type of explosive possessing a high resistance to water.

Nongelatinous blasting explosives of the type customarily used are normally comprised of a mixture of dry, solid ingredients such as ammonium and/or sodium nitrates, wood pulp, and/or other carbonaceous ingredients and sensitizing explosives such as nitrostarch, di- or tri-nitrotoluenes or the like, either with or without nitroglycerin and other liquid sensitizers. A finely powdered antacid such as chalk is also added to most compositions.

Dynamites of the above type, while suitable for blasting in dry holes, have the disadvantage of such poor resistance to water that they cannot be used in boreholes that are appreciably wet. Water in contact with such mixtures will penetrate fairly rapidly, dissolving or saturating the ingredients and greatly reducing or completely overcoming the explosive force. Since the occurrence of wet boreholes is fairly common, the application of such dynamites is seriously restricted. Consequently numerous attempts have been made in the past to increase their water resistance. These attempts have been restricted to two methods, one involving the use of rigid or semirigid, waterproof containers, for example, of tin-plate or heavy paper, and the other involving surface treatments of the water-sensitive ingredients, for example, by coating the salt content of the dynamites with water-repellant or resistant coating agents such as wax-like or resinous substances.

While a very high degree of water resistance may be imparted by using water-proof containers, the provision of an inflexible or stiff container involves manufacturing difficulties, may increase the hazards of packing sensitive explosives, and restricts the useful applications of the dynamite. For example, the cartridges may not be subdivided or deformed to fit the borehole.

The coating of the water-soluble salts, although not subject to these disadvantages necessarily involves an additional step in the manufacture of the dynamite ingredients. This necessity considerably complicates the manufacturing procedures, especially in case of mixtures containing several components. In such cases, it is usual to coat only the ingredient that is the most affected by the water, for example, the ammonium nitrate, and rely on the water resistance of the coated ingredient to protect the rest of the mixture. This procedure, however, is not completely satisfactory and does not always give the desired effect. The coating of the entire mixture, or of coating each ingredient separately, is not feasible because of the increased hazard and the involved manufacturing processes.

The object of this invention is to produce a blasting explosive which is resistant to water.

A further object of this invention is to provide a non-gelatinous blasting explosive admixture which is resistant to water.

A further object is to produce a mixture of water-sensitive materials which resists the penetration of water.

A further object of this invention is to provide a mechanical admixture containing water-soluble salts which will be resistant to water.

A further object is to provide a means for reducing the rate of solution of a soluble salt in water.

A still further object of this invention is to provide a material which when incorporated in an admixture produces an increased water resistance.

Other objects will be apparent hereinafter.

These objects in accordance with this invention are accomplished by adding to the dynamites or mixtures of water-sensitive and soluble ingredients during the mixing thereof, for example, by conventional mixing machines, a small proportion of substantially petroleum-hydrocarbon insoluble pine wood resin in finely divided or pulverized condition. The amount to be added may be varied between fairly wide limits to give the desired water resistant effect, but it has been found that between about 0.1% and about 5% gives the maximum water resistance with the minimum effect on the explosive power and other physical properties of the composition, and preferably between about 0.25% and about 2.0% is used. The addition of this substantially petroleum-hydrocarbon insoluble pine wood resin to soluble salts and mixtures thereof in explosive compositions protects the soluble salts against the action of water. In accordance with this invention the use of this resin has been found adaptable for other applications, for example, in reduction in the rate of solution of soluble fertilizer salts, etc.

The principal requirements for a successful application of my method are the use of the insoluble resin in the proper screen size and the attainment of a sufficiently thorough distribution thereof among the other ingredients in the mixture. To produce a satisfactory effect the substantially petroleum-hydrocarbon insoluble pine wood resin must usually be reduced to a particle size such that substantially all of the material will pass a 60 mesh screen and preferably will pass a 100 mesh screen. However, in the special case of application to nitroglycerin-containing explosives, I have found that coarser material may be used, for example, material passing a 20 mesh screen but held on a 60 mesh screen was suitable. This I attribute to the fact that the resin is slightly soluble in the nitroglycerin and the partial or complete solution of the coarser particles leads to a more thorough distribution, but I do not wish to be limited to this explanation. The use of the coarser material is advisable only in case of explosives containing nitroglycerin.

The substantially petroleum-hydrocarbon insoluble pine wood resin is adaptable for use in this application on account of its brittleness and the facility with which it may be pulverized to a finely divided form. It is superior to many other resins, in this respect. In addition, the melting point of the material is sufficiently high so that once pulverized, it does not tend to sinter or flow together again, but remains free-flowing. This resin may be obtained commercially in a pulverized form and will remain in the pulverized form indefinitely. The commercial material normally has the following screen analysis— 100% through 30 mesh, 90% through 80 mesh and 60% through 100 mesh.

The present method for attaining a high degree of water resistance comprises the admixture of the finely powdered resin into the salt containing admixtures at room temperature. By the present method, the entire process is carried out at normal temperatures and this leads to great simplicity in operation and improved safety. It is possible in accordance with this invention to protect substances against water that are too sensitive (e. g. chlorates) to stand the coating procedures known heretofore. Since the process of this invention is carried out at room temperatures any materials may be processed without danger.

A specific example of the preparation of a water-soluble salt having a high degree of water resistance, by the method of this invention, is given below.

A quantity of substantially petroleum-hydrocarbon insoluble pine wood resin was pulverized by grinding. Over 90% of the ground product would pass a 100 mesh screen and approximately 50% passed a 200 mesh screen. One part of the powdered resin was added to 99 parts of granular ammonium nitrate and the two substances were thoroughly mixed at room temperature. The resultant mixture was tested for water resistance by the following method.

The test I employ to determine water resistance of such mixtures and of dynamites comprises packing the material firmly into a 25 cc. Gooch crucible, covering the material with a layer of cheesecloth stretched tightly over the top, immersing the crucible and contents in water at 65° F. in an inverted position to a depth of 2 inches, suspended by wires. After a predetermined time, the crucible and contents are removed and drained, the dry contents separated by a knife from the moistened portion, and the weight of the former determined as percentage of the original material.

The comparative water resistance of the untreated and treated ammonium nitrate as described above is given in Table I.

TABLE I

| Material | Water resistance (24 hrs.) |
|---|---|
| | Per cent |
| Untreated ammonium nitrate | 0 |
| Ammonium nitrate containing 1% substantially petroleum-hydrocarbon insoluble pine wood resin | 59 |

The comparative water resistance of dynamites with and without small proportions of the pine wood resin is given in Table II.

TABLE II

*Dynamite composition*

| | A | B |
|---|---|---|
| | Per cent | Per cent |
| Nitroglycerin | 13.5 | 13.5 |
| Ammonium nitrate | 74.0 | 74.0 |
| Sodium nitrate | 4.8 | 4.8 |
| Carbonaceous materials and chalk | 7.7 | 7.2 |
| Pulverized substantially petroleum-hydrocarbon insoluble pine wood resin | 0.0 | 0.5 |
| Water resistance (24 hrs.) | 0 | 84 |

It is evident from these results that when used in soluble salts or in dynamite compositions of a type usually possessing little or no resistance to the penetration of water, a small proportion of pulverized substantially petroleum-hydrocarbon insoluble pine wood resin imparts a notable water resistance.

I have also found that the pulverized resin may be added to compositions containing coated salts and the water resistance thereof materially increased. For example, a dynamite was prepared with the following composition: 13.0% nitroglycerin, 37.5% ammonium nitrate (coated with 1% of a wax-resin mixture as disclosed in my copending application Serial No. 152,668), 34.7% uncoated sodium nitrate, 14.3% carbonaceous ingredients, sulfur and chalk, and 0.5% pulverized substantially petroleum-hydrocarbon insoluble pine wood resin. When submitted to the above water resistance test, this dynamite was 72% dry after 16 hours immersion in water. Corresponding samples with the same formula but (1) without the gasoline insoluble resin or (2) without either the coating or the powdered resin gave test results of about 30% and 0% dry after a 16 hour test. The latter dynamite was completely wet after less than 10 minutes immersion. Thus it will be seen that whereas the application of either the powdered resin or a resin-wax coating will result in a considerable improvement in water resistance, an improved resistance may be realized from the combination of both.

The substantially petroleum-hydrocarbon pine wood resin which I have found greatly increases the water resistance of various dynamite compositions may be modified by various chemical treatments such as for example, by condensing with formaldehyde, surface treating with calcium oxide, precipitating with calcium oxide, or by the formation of other water insoluble modified forms with various chemicals. These water insoluble modified forms of the resin have been found to give improved water resistance equivalent to those results obtained by using the unmodified resin.

A modified resin was prepared by treating an aqueous suspension of the substantially petroleum-hydrocarbon insoluble pine wood resin with